United States Patent
Koo et al.

(10) Patent No.: US 9,745,219 B2
(45) Date of Patent: Aug. 29, 2017

(54) APPARATUS FOR FORMING FRONT GLASS FOR DISPLAY OF ELECTRONIC DEVICE

(71) Applicant: 61C&S Co., Ltd., Seoul-si (KR)

(72) Inventors: Ja-Ock Koo, Yongin-si (KR); Kue Jung Choi, Anseong-si (KR)

(73) Assignee: 61C&S Co., Ltd., Seoul-si (KR)

( * ) Notice: Subject to any disclaimer, the term of this patent is extended or adjusted under 35 U.S.C. 154(b) by 0 days.

(21) Appl. No.: 14/959,429

(22) Filed: Dec. 4, 2015

(65) Prior Publication Data

US 2017/0158548 A1    Jun. 8, 2017

(51) Int. Cl.
*C03B 23/03* (2006.01)

(52) U.S. Cl.
CPC ...... *C03B 23/0302* (2013.01); *C03B 2215/50* (2013.01)

(58) Field of Classification Search
CPC ..... C03B 23/02; C03B 23/03; C03B 23/0302; C03B 23/0305; C03B 2215/50; C03B 2215/60
See application file for complete search history.

(56) References Cited

U.S. PATENT DOCUMENTS

| | | | | |
|---|---|---|---|---|
| 6,223,561 B1* | 5/2001 | Fukuyama | ............ | C03B 11/082 100/258 A |
| 2012/0144866 A1* | 6/2012 | Liu | ............ | C03B 23/0302 65/104 |
| 2012/0324955 A1* | 12/2012 | Lim | ............ | C03B 23/0307 65/60.1 |
| 2015/0000340 A1* | 1/2015 | Jang | ............ | C03B 23/0305 65/106 |
| 2015/0353410 A1* | 12/2015 | Funatsu | ............ | C03B 23/0302 65/61 |

* cited by examiner

*Primary Examiner* — Cynthia Szewczyk
(74) *Attorney, Agent, or Firm* — Hauptman Ham, LLP

(57) ABSTRACT

A forming apparatus for cleanly forming front glass for a portable terminal includes an upper mold 10 including an upper mold body 12 of a specific thickness and a protruded portion 14 protruded from the bottom surface of the upper mold body and a lower mold 20 including a lower mold body 22 of a specific thickness and a concave portion 24 concavely formed in the top surface of the lower mold body in such a way as to correspond to the protruded portion. Curved surface forming portions 16 and 26 are formed in the edge portion of the protruded portion 14 of the upper mold and the edge portion of the concave portion of the lower mold. The curved surface forming portions 16 and 26 are formed into line contact portions 16a and 26a coming into line contact with the end portions of the top and bottom surfaces of the glass, respectively.

3 Claims, 4 Drawing Sheets

APPARATUS FOR FORMING FRONT GLASS FOR DISPLAY OF ELECTRONIC DEVICE

FIELD OF THE INVENTION

The present invention relates to an apparatus for forming front glass for an electronic device, such as a smart phone or a portable terminal and, more particularly, to an apparatus for forming front glass for the display of an electronic device, which is capable of forming front glass so that a fine shape or form on a surface of a mold is not transferred to the front glass by forming the curved surface areas of the front glass through a minimum contact.

BACKGROUND OF THE INVENTION

Glass is installed in the front surface of a display device, such as an LCD or an LED, in portable terminals including smart phones which recently come into use. Furthermore, a specific function is designed to be executed by touching front glass because a touch pad function is included in such a display device. Furthermore, such front glass is also widely applied to home appliances, such as TV, and an electronic device for vehicle, such as a navigator, in addition to a smart phone and a personal terminal having a specific function. Furthermore, such front glass is also called touch window glass in a device having a touch pad function, such as that in a smart phone.

Such front glass is applied to products as 2D glass commonly having a plane shape. Recently, the front glass of TV, that is, one of home appliances, is generally formed into a curved surface or the ends of front glass on the left and right sides are formed into curved surfaces on the basis of a single axis. The front glass of a smart phone is also formed of curved surface glass having various types. Furthermore, glass formed to have a curved surface as described above is commonly called 3D glass.

Furthermore, for example, the 3D glass of a smart phone may be formed into a curved surface with respect to any one of an X axis and a Y axis on the XY plane. Furthermore, although the 3D glass is formed to have curved surfaces with respect to a single axis as described above, the entire front glass may be formed into a curved surface or at least one of the left and right ends of front glass may be formed into a curved surface. Furthermore, some of four sides forming front glass may be formed into curved surfaces, or all of the four sides may be formed into curved surfaces.

As shown in FIG. 1, 3D glass having a curved surface as described above is commonly formed by an upper mold Da and a lower mold Db. That is, the shape of the 3D glass is determined by the shape of a cavity formed between the upper mold Da and the lower mold Db. That is, in the state in which glass of a plane shape initially indicated by Ga has been heated, the glass is deformed by weight of the upper mold and formed into front glass having a 3D shape, such as that indicated by Gb.

That is, when 3D glass is formed, in the state in which glass, that is, a material, has been heated up to a temperature at which the glass may be subjected to plastic deformation by an external force, 3D glass (also called curved glass) having a required shape is completed by applying pressure using the upper mold and the lower mold. Such a processing temperature is very lower than a melting point, and pressure through the mold is applied to glass.

In this case, the glass is processed in the state in which it has been heated up to a temperature at which the glass may be subjected to plastic deformation by an external force.

Furthermore, the mold which is used to form glass is made of graphite. It has been known that mirror-like processing is substantially impossible for such graphite. Accordingly, when a specific force is applied to front glass through the mold in a high temperature atmosphere, a pattern or shape on a surface of the mold is inevitably delivered to touch window glass.

In particular, in the curved surface portions of the front glass, pressure higher than pressure in a plane portion is delivered from the mold to glass, thereby substantially greatly deforming the glass. Accordingly, a disadvantage is generated on a surface of the glass because the processed surface of the glass moves along a surface of the mold in a fixed state. As described above, 3D glass inputted between the upper mold and the lower mold and produced through the surface contact of the entire surface of 3D with the mold may include a disadvantage, such as a fine scar or mark, in a curved surface portion compared to a mirror surface.

SUMMARY OF THE INVENTION

An object of the present invention is to provide a forming apparatus, which does not generate any scar or a disadvantage transferred from a mold in a curved surface portion when forming front glass for the display of an electronic device which at least partially has a curved surface.

The present invention has been made keeping in mind solving a disadvantage transferred from a mold to glass by minimizing a contact portion between the curved surface portion of the glass and the mold when the curved surface portion of front glass for the display of an electronic device is formed.

In accordance with an embodiment of the present invention, an apparatus for forming front glass for the display of an electronic device includes an upper mold including an upper mold body of a specific thickness and a protruded portion protruded from the bottom surface of the upper mold body and a lower mold including a lower mold body of a specific thickness and a concave portion concavely formed in the top surface of the lower mold body in such a way as to correspond to the protruded portion. In this case, curved surface forming portions are formed in the edge portion of the protruded portion of the upper mold and the edge portion of the concave portion of the lower mold, respectively, and form the curved surface areas of glass. The curved surface forming portions of the upper mold and the lower mold include line contact portions coming into line contact with the end portions of top and bottom surfaces of the glass, respectively. Furthermore, weight of the upper mold is delivered to the glass through the line contact portion in a high temperature atmosphere, so the glass is formed into a plane area in a central portion of the glass and at least one curved surface area formed in the edge portion of the glass.

In accordance with another embodiment of the present invention, a forming apparatus includes an upper mold including an upper mold body of a specific thickness and a protruded portion protruded from the bottom surface of the upper mold body having a plane forming portion coming into contact with the top surface of glass to be formed; a lower mold including a lower mold body of a specific thickness, a concave portion concavely formed in the top surface of the lower mold body, and a plane forming portion upward protruded from the center of the concave portion and coming into contact with the bottom surface of the glass; and pressurization means for pressurizing at least one side of the glass into the concave portion so as to form a curved surface area of the glass interposed between the plane forming portions of the upper mold and the lower mold in a high temperature atmosphere.

In this case, in accordance with a first embodiment of the pressurization means, the pressurization means is formed on the edge portion of the protruded portion in the bottom surface of the upper mold and includes a curved surface forming protrusion more extended than the protruded portion downwardly. The curved surface forming protrusion comes into line contact with the top surface of the glass, thereby being capable of forming clean glass.

Furthermore, in accordance with a second embodiment of the pressurization means, the pressurization means may include a leg disposed over the concave portion of the lower mold, downward extended through a support hole formed in the upper mold, and configured to pressurize the end portion of the glass and a head formed over the leg and engaged with the support hole.

In accordance with yet another embodiment of the present invention, the plane forming portion of the upper mold and the plane forming portion of the lower mold are configured to partially come into contact with the top surface and bottom surface of the glass. For example, the plane forming portion of the upper mold and the plane forming portion of the lower mold may be configured to partially come into line contact with the top surface and bottom surface of the glass.

DETAILED DESCRIPTION OF THE INVENTION

Hereinafter, exemplary embodiments of the present invention are described in detail with reference to the accompanying drawings.

Figure 1:
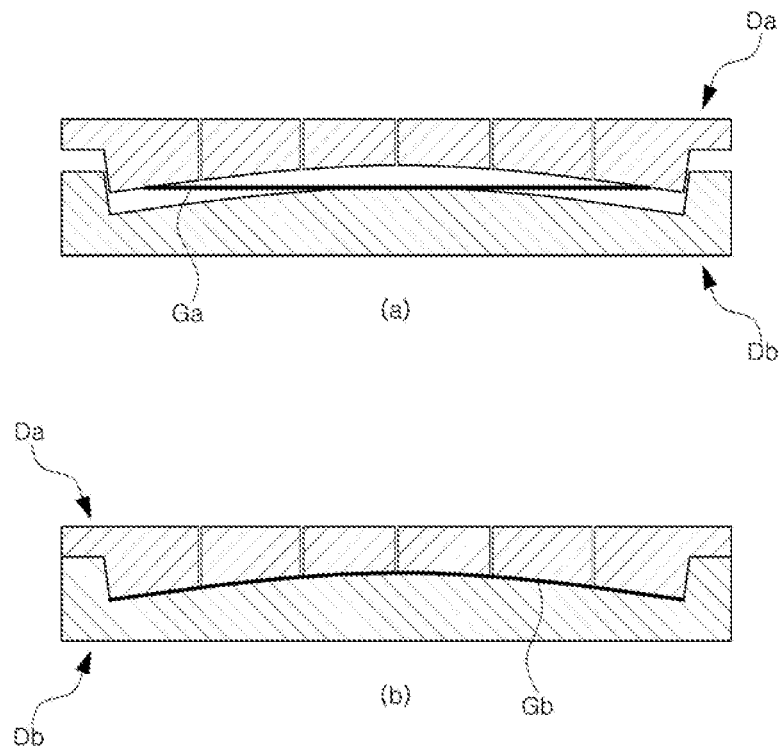
FIG. 1 is an exemplary cross-sectional diagram of a conventional mold for forming 3D glass.
Figure 2:
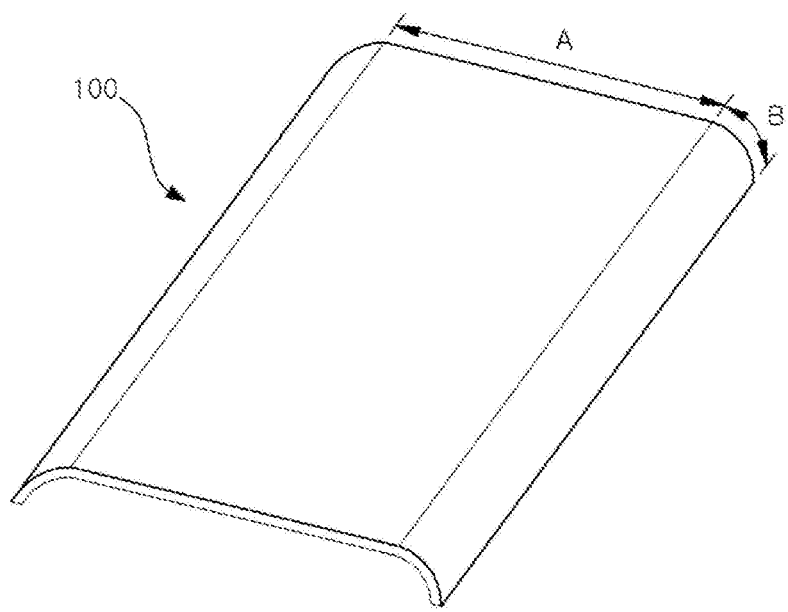
FIG. 2 is an exemplary perspective view of conventional 3D glass.

FIG. 2 shows a perspective view of front glass 100 to be produced through a forming apparatus according to an embodiment of the present invention. As shown in FIG. 2, the front glass 100 according to an embodiment of the present invention includes a plane area A configured to form a specific portion and curved surface areas B configured to be consecutive to the plane area A and to have a specific radius of curvature. Furthermore, in a smart phone having a touch panel function, such front glass is also called touch window glass. Hereinafter, the present invention is described in connection with embodiments implemented in such touch window glass for a smart phone.

An embodiment of the present invention provides an apparatus for forming touch window glass for a smart phone, including a plane area and curved surface areas. FIG. 2 shows an example of such touch window glass. In the illustrated embodiment, the plane area A is formed in the central portion of the touch window glass 100 in one direction, and the curved surface areas B are formed into curved surfaces on both sides of the plane area A in a specific radius of curvature. In an embodiment of the present invention, the curved surface area B includes all forms having curved surfaces other than a plane, in addition to a curved surface having a specific radius of curvature.

Furthermore, as shown in FIG. 2, in such touch window glass, ends on both sides of the touch window glass which face each other may be formed into the curved surface areas B, or any one of the ends on one side thereof may be formed into the curved surface area B. In some embodiments, all of the four sides of touch window glass may be formed into curved surface areas. Furthermore, in the touch window glass 100 produced by a forming apparatus according to an embodiment of the present invention, the plane area A and the curved surface areas B have been illustrated as being consecutively formed.

Figure 3:
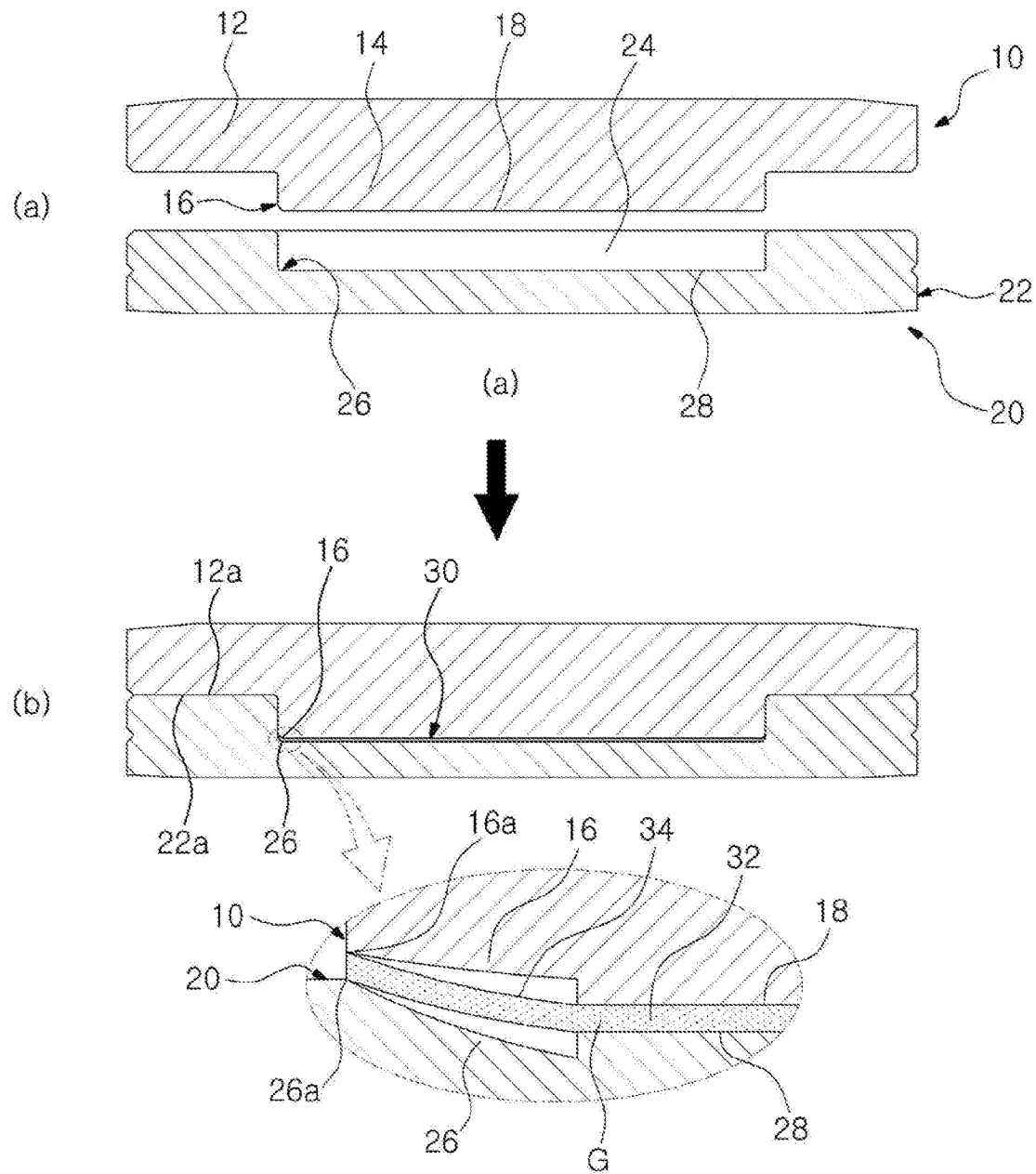
FIG. 3 is an exemplary cross-sectional diagram of a forming apparatus according to a first embodiment of the present invention.

A forming apparatus according to an embodiment of the present invention is described in more detail below with reference to FIG. 3. As shown in FIG. 3, the forming apparatus for touch window glass according to an embodiment of the present invention includes an upper mold 10 and a lower mold 20 between which a cavity corresponding to 3D glass is formed in the state in which the upper mold 10 and the lower mold 20 have been combined. The upper mold 10 includes an upper mold body 12 configured to have a rectangular shape of a specific thickness, for example, and a protruded portion 14 of a rectangular shape configured to be downward extended from the bottom of the central portion of the upper mold body 12.

Furthermore, the lower mold 20 includes a lower mold body 22 configured to have a shape corresponding to the upper mold body 12 and a concave portion 24 concavely formed in the top surface of the lower mold body 22 so that it corresponds to the protruded portion 14. When the upper mold 10 and the lower mold 20 are combined, a cavity 30 is formed between the upper mold 10 and the lower mold 20. The cavity 30 has the same shape as touch window glass G that has been substantially formed.

The cavity 30 substantially has the same shape as the 3D glass (or curved glass) G. The cavity 30 includes curved surface portions 34 which may be formed in at least some of the four sides of the touch window glass and a full plane portion 32 formed inside the curved surface portions 34. In this case, the curved surface portions 34 and the plane portion 32 may also be used to refer to the same portions in the cavity 30 and the touch window glass G.

Furthermore, a plane forming portion 18 is formed in the central portion of the protruded portion 14 of the upper mold 10. A curved surface forming portion 16 for forming a curved surface is formed at the edge or corner portion of the plane forming portion 18. Furthermore, a plane forming portion 28 corresponding to the plane forming portion 18 of the upper mold 10 and a curved surface forming portion 26 corresponding to the curved surface forming portion 16 of the upper mold 10 are also formed in the lower mold 20.

The curved surface forming portion and plane forming portion of the upper mold 10 and the lower mold 20 have corresponding shapes because the protruded portion 14 and concave portion 24 of the upper mold 10 and the lower mold 20 are spaced apart from each other at a specific interval. Furthermore, the curved surface forming portions 16 and 26 are formed in the respective edge portions of the protruded portion 14 and concave portion 24 of the upper mold 10 and the lower mold 20.

The curved surface forming portions 16 and 26 of the molds 10 and 20 for forming the curved surface portion 34 of the cavity are first described below. The curved surface forming portions 16 and 26 of the molds 10 and 20 function to form glass into a curved surface in at least one side or the four sides of the touch window glass. Accordingly, the curved surface forming portions 16 and 26 may be formed in at least one side or the four sides of the protruded portion 14 and concave portion 24 of the molds 10 and 20.

Furthermore, as may be seen from an enlarged view of FIG. 3, the upper mold 10 includes the plane forming portion 18, and the lower mold 20 includes the plane forming portion 28. Furthermore, the curved surface forming portions 16 and 26 include respective line contact portions 16a and 26a configured to come into line contact with the outside ends of the touch window glass. Accordingly, the line contact portions 16a and 26a of the curved surface forming portions 16 and 26 of the upper mold 10 and the lower mold 20 come into line contact with the touch window glass G. A disadvantage attributable to a surface contact can be solved because the curved surface forming portions 16 and 26 of the upper mold 10 and the lower mold 20 are configured to include the line contact portions 16a and 26a as described above.

The line contact portions 16a and 26a are forming in the respective curved surface forming portions 16 and 26 of the upper mold 10 and the lower mold 20 so that they come into contact with the end portions of the top surface and bottom surface of the touch window glass within a possible range. That is, the line contact portions 16a and 26a of the upper mold 10 and the lower mold 20 come into line contact with the top surface and bottom surface of the touch window glass G. The locations where the line contact portions 16a and 26a of the upper mold 10 and the lower mold 20 come into line contact with the top surface and bottom surface of the touch window glass G may be designed so that the outside ends of the touch window glass G can be supported in the state in which the touch window glass G has been deformed into a curved surface, as shown in the enlarged view of FIG. 3.

Furthermore, in the outsides of the plane forming portions 18 and 28 of the upper mold 10 and the lower mold 20, any portion of the curved surface forming portions 16 and 26 other than the line contact portions 16a and 26a of the curved surface forming portions are designed to escape from the touch window glass G so that it does not come into contact with the touch window glass G. If glass is put between the upper mold and the lower mold and the upper mold 10 is combined with the lower mold 20, in the initial state, the plane forming portion 18 of the upper mold 10 comes into contact with a top surface at the central portion of the lower mold 20. Furthermore, in this case, the bottom surface 12a of the upper mold body 12 of the upper mold 10 has not come into contact with the top surface 22a of the lower mold body 22 of the lower mold 20.

In such a state, when the upper mold 10 and the lower mold 20 are put in a high temperature atmosphere and heated, they are heated up to a temperature which is very lower than the melting point of the touch window glass G, but at which the touch window glass G can be deformed by an external force. If the upper mold 10 and the lower mold 20 are heated up to such a temperature, the side portions (or edge portions) of the touch window glass G will be changed to curved surfaces by a force applied to the touch window glass G through the plane forming portion 18 which presses the central portion of the touch window glass G. Furthermore, if the touch window glass G is fully deformed, the bottom surface 12a of the upper mold 10 comes into contact with the top surface 22a of the lower mold 20.

The state in which the upper mold 10 and the lower mold 20 come into contact with each other as described above is shown in FIG. 3. In this state, the outside portions of the touch window glass G have fully formed the curved surface areas 34. Any portion of the curved surface areas 34 other than the line contact portions 16a and 26a does not come into contact with the molds 10 and 20 by such molds. Accordingly, in a high temperature forming process, any transfer from the molds 10 and 20 is not generated.

In accordance with the first embodiment of the present invention, if the touch window glass is in a temperature at which it can be deformed and a downward force is applied to the touch window glass by the line contact portion 16a of the upper mold 10, portions between the plane portion 32 and the line contact portions 16a and 26a of the touch window glass are bent while forming the curved surfaces because the line contact portion 26a of the lower mold 20 supports the outside ends of the touch window glass.

In such an embodiment, in the state in which the molds 10 and 20 do not substantially come into contact with each other, only the line contact portions 16a and 26a of the molds 10 and 20 come into contact with the outermost portions of the curved surface portions 34 of the touch window glass. Accordingly, the transfer of a pattern or shape on a surface of a mold, that is, a problem in the prior art, can be perfectly prevented.

Figure 4:
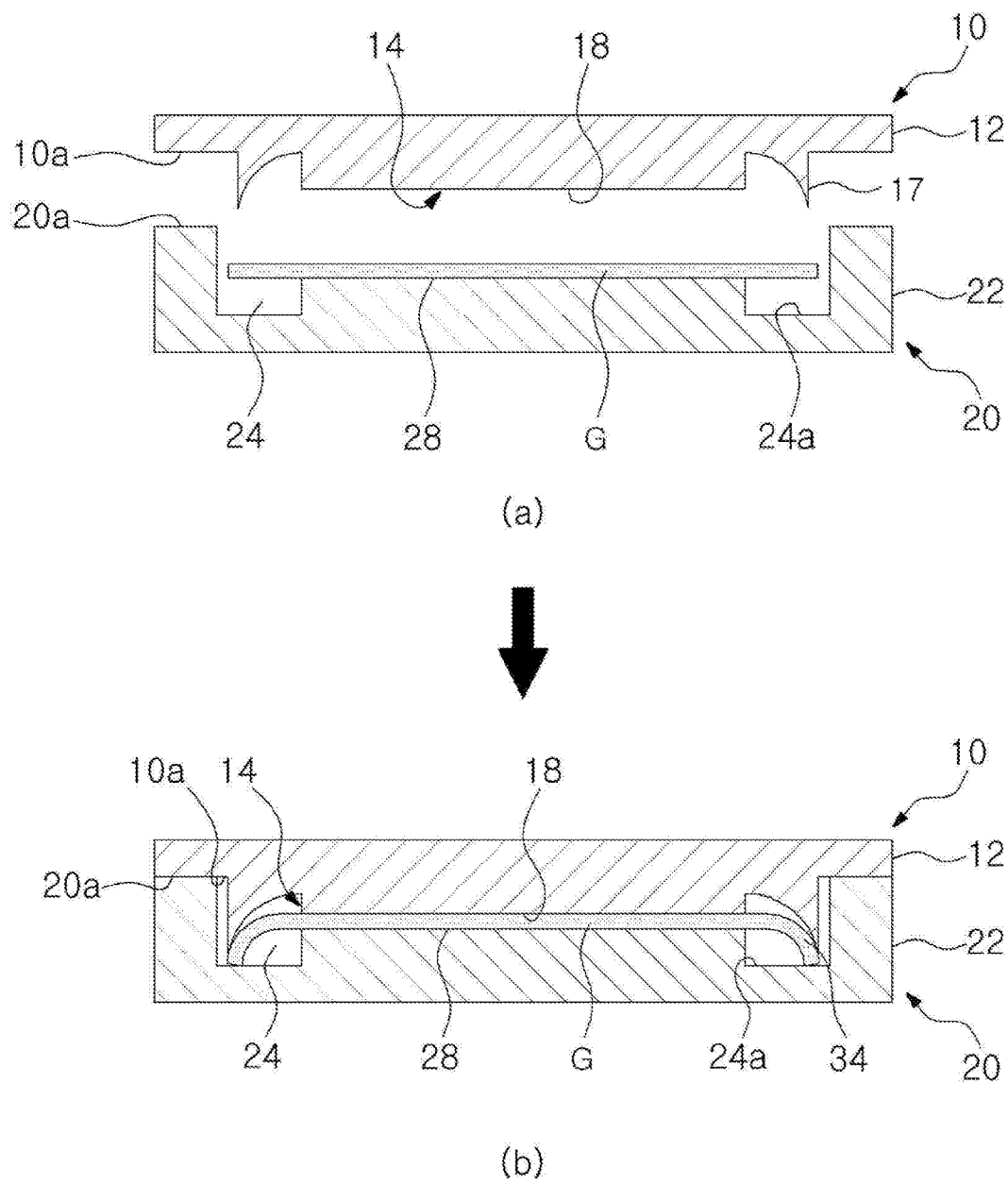
FIG. 4 is an exemplary cross-sectional diagram of a forming apparatus according to a second embodiment of the present invention.

Another embodiment of the present invention is described in detail below with reference to FIG. 4. In the present embodiment, an upper mold 10 presses at least one side of touch window glass G, thereby forming curved surface areas 34. In the present embodiment, the upper mold 10 includes an upper mold body 12 formed to have a rectangular shape and a specific thickness and a protruded portion 14 protruded from the bottom surface of the upper mold body 12 in a specific area and configured to include a plane forming portion 18 coming in contact with the touch window glass G. Furthermore, a curved surface forming protruded portion 17 is further downward extended at a specific interval in the end portion of the plane forming portion 18.

Furthermore, the curved surface forming protruded portion 17 is formed at the location where the end portion of the curved surface area 34 in the front surface of the touch window glass G is pressed. In order to form the curved surface area 34, the curved surface forming protruded portion 17 may be formed to come into line contact with the touch window glass G. The curved surface forming protruded portion 17 is more downward extended than the plane forming portion 18. The curved surface forming protruded portion 17 may be formed to correspond to one side of the touch window glass G in the end portion of the plane forming portion 18 or may be formed to correspond to all of the four sides of the touch window glass G. That is, if one side of the front surface of the touch window glass G is formed into a curved surface, the curved surface forming protruded portion 17 may be formed in only one side. If all of the four sides of the front surface of the touch window glass G are formed into curved surfaces, the curved surface forming protruded portion 17 may also be formed in the four sides. In this case, the curved surface forming protruded portion 17 may have a rectangle when viewed on the plane.

Furthermore, the lower mold 20 includes a plane forming portion 28 formed in an area corresponding to the plane forming portion 18 of the upper mold 10. The plane forming portion 28 may be upward protruded from a concave portion 24 concavely formed in the top surface of the lower mold 20. The plane forming portion 28 comes into contact with the bottom surface of the touch window glass G. The concave portions 24 may be present in all the four sides in the end portion of the plane forming portion 28 along to the entire circumference of the lower mold 20 or the concave portion 24 may be present in any one of the four sides depending on a shape of the 3D glass. Furthermore, the concave portion 24 includes a bottom surface 24a.

Furthermore, the concave portion 24 is formed at the location corresponding to the curved surface forming protruded portion 17, and the bottom surface 24a may determine the lowest location of the outmost side of the touch window glass that is substantially formed into a curved surface. Furthermore, the location of the curved surface forming protruded portion 17 may be determined so that the curved surface forming protruded portion 17 is coupled with the outermost part of the concave portion 24. Furthermore, the top surface 20a of the lower mold 20 is placed higher than the plane forming portion 28, and a portion of the lower mold 20 including the top surface 20a may form an edge in the end portion of an escape groove 28a.

In such an embodiment, when the touch window glass G is interposed between the upper mold 10 and the lower mold 20, in the initial state shown in FIG. 4(a), the touch window glass G is placed on the plane forming portion 28 of the lower mold 20, and the curved surface forming protruded portion 17 of the upper mold 10 comes into contact with the top surface of the touch window glass G. In such a state, the bottom surface 10a of the upper mold 10 has been separated from the top surface 20a of the lower mold 20.

In this state, the touch window glass G is heated up to a temperature at which it can be deformed by an external force. After a lapse of a specific time, weight of the upper mold 10 is delivered to the touch window glass G through the curved surface forming protruded portion 17. Furthermore, as shown in FIG. 4(b), each side of the touch window glass G is formed to have the curved surface area 34. At this time, the bottom surface of the escape groove 28 as come into contact with the end portion of the curved surface areas 34 of the touch window glass G, and the bottom surface 10a of the upper mold 10 and the top surface 20a of the lower mold 20 also come into contact with each other.

Figure 5:
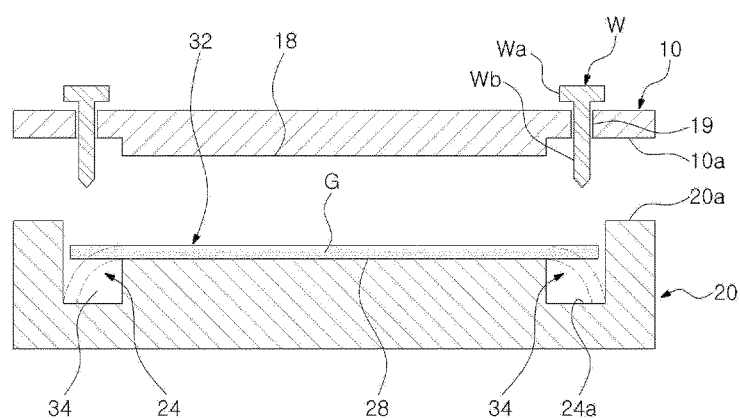
FIG. 5 is an exemplary cross-sectional diagram of a forming apparatus according to a third embodiment of the present invention.

An embodiment of FIG. 5 is described below. In the present embodiment, a push member W configured to press a side (i.e., an edge portion or a portion formed into a curved surface area) of touch window glass G is formed separately from the upper mold in the embodiment of FIG. 4. As shown in FIG. 5, an upper mold 10 includes a plane forming portion 18 that is downward protruded. Furthermore, the push member W configured to have a length corresponding to one side of the touch window glass G is coupled with a support hole 19 formed in the upper mold 10.

Furthermore, a plane forming portion 28 corresponding to the plane forming portion 18 is formed in a lower mold 20. A concave portion 24 is formed in the end portion of the plane forming portion 28. Furthermore, the push member W is supported at the location corresponding to the concave portion 24. In the illustrated embodiment, the push member W includes a head Wa engaged with the top of the support hole 19 and a leg Wb downward extended from the head Wa and configured to penetrate the support hole 19. The end of the leg Wb downward pressurizes a side portion of the touch window glass G by a specific force.

In the initial state in which the upper mold 10 and the lower mold 20 have been combined, the touch window glass G has been supported with it inserted between the plane forming portions 18 and 28, and the bottom surface 10a of the upper mold 10 has closely adhered to the top surface 20a of the lower mold 20. Furthermore, the bottom end of the push member W come into contact with the outermost part of the touch window glass G to be processed in a curved surface shape.

In such a state, the touch window glass G is heated up to a temperature at which it can be deformed by an external force. After a lapse of a specific time, weight of the push member W is delivered to the touch window glass G. Next, each side of the touch window glass G is formed into a curved surface so that it has a curved surface area 34. At this time, the end portion of the curved surface area of the touch window glass G may come into contact with the bottom surface of the concave portion 24. In the present embodiment, the number of concave portions 24 and push members W may be different depending on a shape of the curved surface area of the touch window glass G to be formed. For example, as shown in FIG. 2, if the curved surface areas need to be formed only on both sides of the touch window glass G, each of the escape grooves 28a and the push members W corresponding to the two sides of the touch window glass G may have been formed in pairs.

In the present embodiment, the push member W has been illustrated as applying a specific force to the top surface of the touch window glass G by its self-weight, but the present invention is not limited thereto. For example, a separate pressurization device configured to downward pressurize the push member W may be used. The top surface of the touch window glass G may be downward pressed by such a pressurization device.

Yet another embodiment of the present invention is described below with reference to FIG. 6. The aforementioned embodiments may correspond to an embodiment in which a contact between the molds 10 and 20 is minimized when the curved surface area of the touch window glass 34 is formed. In contrast, the present embodiment corresponds to an embodiment in which a contact between the molds 10 and 20 is minimized in the curved surface area 34 as in the aforementioned embodiments and a contact between the molds 10 and 20 is also minimized even in the plane area 32. Only parts different from those of the aforementioned embodiments are described for simplicity.

Figure 6:
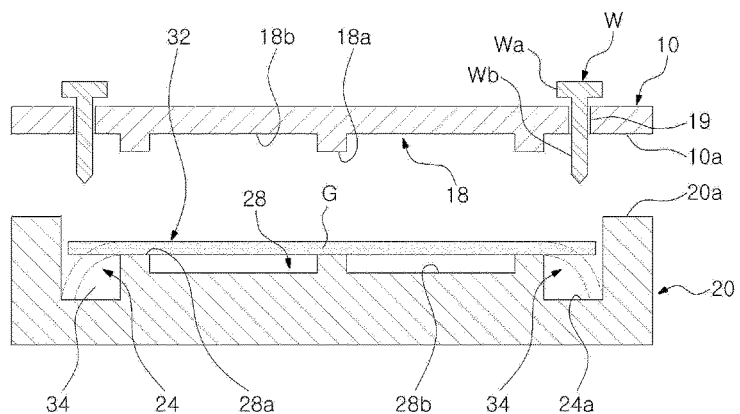
FIG. 6 is an exemplary cross-sectional diagram of a forming apparatus according to a fourth embodiment of the present invention.

As shown in FIG. 6, in the present embodiment, the plane forming portion 18 of an upper mold 10 and the plane forming portion 28 of a lower mold 20 are configured to do not generally come into surface contact with the plane area 32 of touch window glass G, but to partially come into surface contact with the plane area 32 of touch window glass G. That is, the plane forming portions 18 and 28 of the molds 10 and 20 include contact portions 18a and 28a configured to come into contact with the touch window glass G and escape portions 18b and 28b cut from the contact portions 18a and 28a.

In this case, the contact portions 18a and 28a partially come into surface contact with the touch window glass G, and the escape portions 18b and 28b never come into contact with the touch window glass G. If an area coming into contact with the touch window glass G is reduced as described above, a fine shape or pattern on a surface of a mold can be prevented from being transferred to the touch window glass G.

Accordingly, the contact portions 18a and 28a may come into contact with the plane area 32 of the touch window glass G with a small area as small as possible within a range in which the touch window glass G can maintain a plane. In some embodiments, the contact portions 18a and 28a may be linearly formed to have narrow widths as narrow as possible so that they come into contact with the touch window glass G in a form close to a line contact.

As described above, in accordance with an embodiment of the present invention, when 3D glass including a plane area and a curved surface area is formed, an area coming into contact with a mold in a curved surface area, in particular, can be minimized. For example, an advantage in which a curved surface portion of 3D glass can be substantially formed in a very clean state may be expected because a mold and the curved surface areas of the 3D glass partially come into contact with each other or come into line contact with each other.

Furthermore, in accordance with an embodiment of the present invention, an advantage in which clean 3D glass can be provided even in a plane area may be expected by minimizing the size of a contact area even in the plane area as much as possible, that is, by minimizing a contact area through a line contact.

Furthermore, those skilled in the art will understand that the present invention may be modified in other various ways within the category of the basic technical spirit of the present invention. It is considered that the scope to be protected by the present invention should be substantially interpreted based on the appended claims.

What is claimed is:

1. An apparatus for forming a glass for a display of an electronic device, the apparatus comprising:
    an upper mold comprising
        an upper mold body of a specific thickness,
        a protruded portion protruded from a bottom surface of the upper mold body, the protruded portion having an upper plane forming portion for coming into contact with a top surface of the glass to be formed, and
        an upper curved surface forming protrusion formed in an edge of the protrude portion, the upper curved surface forming protrusion protruded from the bottom surface of the upper mold body; and
    a lower mold comprising
        a lower mold body of a specific thickness,
        a concave portion concavely formed in a top surface of the lower mold body, and
        a lower plane forming portion upward protruded from a center of the concave portion for coming into contact with a bottom surface of the glass,
    wherein the upper curved surface forming protrusion is protruded downwardly farther than the protruded portion and configured to press at least one edge of the glass into an edge portion of the concave portion so as to form a curved surface area of the glass interposed between the upper and lower plane forming portions in an atmosphere of a high temperature.

2. The apparatus of claim 1, wherein
    the upper plane forming portion of the upper mold comprises a first plurality of protrusions formed on the upper plane forming portion, and
    the lower plane forming portion of the lower mold comprises a second plurality of protrusions formed on the lower plane forming portion.

3. An apparatus for forming a glass for a display of an electronic device, the apparatus comprising:
    an upper mold comprising
        an upper mold body of a specific thickness,
        a protruded portion protruded from a bottom surface of the upper mold body, the protruded portion having an upper plane forming portion for coming into contact with a top surface of the glass to be formed, and
        a support hole disposed on an edge portion of the upper mold body and outside from the protruded portion of the upper mold;
    a lower mold comprising
        a lower mold body of a specific thickness,
        a concave portion concavely formed in a top surface of the lower mold body, and
        a lower plane forming portion upward protruded from a center of the concave portion for coming into contact with a bottom surface of the glass; and
    a push member comprising
        a leg configured to pass through the support hole of the upper mold and push an edge portion of the glass into an edge portion of the concave portion of the lower mold, and
        a head formed over the leg and configured to engage with the support hole.

* * * * *